(12) United States Patent
Comley et al.

(10) Patent No.: US 11,007,550 B2
(45) Date of Patent: May 18, 2021

(54) METHOD FOR APPLYING A POWDER COATING

(71) Applicant: The Sherwin-Williams Company, Cleveland, OH (US)

(72) Inventors: David G. Comley, Stoney Creek (CA); Oscar A. Ojero, Hamilton (CA); Ronald E. McMahon, Avon Lake, OH (US)

(73) Assignee: THE SERWIN-WILLIAMS COMPANY, Cleveland, OH (US)

(*) Notice: Subject to any disclaimer, the term of this patent is extended or adjusted under 35 U.S.C. 154(b) by 19 days.

(21) Appl. No.: 15/978,689

(22) Filed: May 14, 2018

(65) Prior Publication Data

US 2018/0361429 A1 Dec. 20, 2018

Related U.S. Application Data

(62) Division of application No. 13/827,005, filed on Mar. 14, 2013, now abandoned.

(51) Int. Cl.

| | |
|---|---|
| *B05D 3/10* | (2006.01) |
| *B05D 7/00* | (2006.01) |
| *C09D 5/03* | (2006.01) |
| *B05D 1/06* | (2006.01) |

(52) U.S. Cl.
CPC ............... *B05D 3/108* (2013.01); *B05D 1/06* (2013.01); *B05D 7/542* (2013.01); *C09D 5/03* (2013.01)

(58) Field of Classification Search
None
See application file for complete search history.

(56) References Cited

U.S. PATENT DOCUMENTS

2006/0188655 A1* 8/2006 Reising .................... B05D 7/14
427/407.1

FOREIGN PATENT DOCUMENTS

WO WO-2011134986 A1 * 11/2011 ........... B05B 5/0535

* cited by examiner

*Primary Examiner* — Shamim Ahmed
*Assistant Examiner* — Bradford M Gates
(74) *Attorney, Agent, or Firm* — Merchant & Gould P.C.

(57) ABSTRACT

A method for the application of at least two different powder coating layers to a substrate comprising the steps of application of a first powder coating layer followed by the application of a second powder coating layer, without any substantial curing of the first powder coating layer prior to the application of the second powder coating layer, followed by the simultaneous curing at a temperature and time period sufficient to substantially cure the first powder coating layer and the second powder coating layer, wherein the first powder coating layer and the second powder coating layer each comprise at least one resin independently having at least one functional group in stoichiometric ratios sufficient to react or crosslink with the other layer at the interface of the two or more layers.

6 Claims, 2 Drawing Sheets

METHOD FOR APPLYING A POWDER COATING

BACKGROUND OF THE INVENTION

This Application is a Divisional of U.S. application Ser. No. 13/827,005, filed Mar. 14, 2013, and entitled "Method for Applying a Powder Coating", which is incorporated herein by reference in its entirety.

Typically, powder coatings are applied as a single coat direct to metal or as a coating over another layer of powder primer which has been previously cured. These methods are referred to as a conventional powder coating application process. These conventional process steps are generally stepwise as follows:
Step 1: Apply first layer;
Step 2: Cure first layer;
Step 3: Apply second layer; and
Step 4: Cure second layer.

In some processes of two-layer powder coating systems, a first layer is applied and heated to create a "melt" and then a second layer is applied over the first layer "melt" thus requiring an additional process step of heating to create a melt. According to this invention, a powder coating topcoat and a powder coating primer coat that have reactive functionalities with each other can be electrostatically applied by spray (the first layer powder coating primer is applied to substrate followed by the application of a reactive topcoat or reactive subsequent topcoats) and heated and cured only once, thus eliminating at least one complete coating cure cycle. These methods are referred to as dry-on-dry application process. These process steps are as follows:
Step 1: Apply first layer;
Step 2: Apply second layer (and subsequent layers) having functionalities reactive with the first (or previous) layer, and applying the second (and subsequent layers) before the previous layer cures;
Step 3: Cure first layer and second (and subsequent layers) simultaneously.

SUMMARY OF THE INVENTION

The present invention relates to a method for the application of at least two different powder coating layers to a substrate comprising the steps of application of a first powder coating layer followed by the application of a second powder coating layer, without any substantial curing of the first powder coating layer prior to the application of the second powder coating layer, followed by the simultaneous curing at a temperature and time period sufficient to substantially cure the first powder coating layer and the second powder coating layer, wherein the first powder coating layer and the second powder coating layer each comprise at least one resin independently having at least one functional group in stoichiometric ratios sufficient to react or crosslink with the other layer at the interface of the two or more layers.

The present invention also is a vault-coat, one-bake coating system, comprising a first powder coating layer followed by the application of a second (or subsequent) powder coating layer(s), without any substantial curing of the first powder coating layer prior to the application of the second (or subsequent) powder coating layer(s), followed by the simultaneous curing of the first powder coating layer and the second (or subsequent) powder coating layer(s), wherein the first powder coating layer and the second (or subsequent) powder coating layer(s) each comprise at least one resin independently having at least one functional group that is reactive or crosslinkable with the previously applied layer.

In another embodiment, the present invention is a coated article comprising a multi-coat, one-bake coating system, comprising a first powder coating layer followed by the application of a second (or subsequent) powder coating layer(s), without any substantial curing of the first powder coating layer prior to the application of the second (or subsequent) powder coating layer(s), followed by the simultaneous curing of the first powder coating layer and the second (or subsequent) powder coating layer(s), wherein the first powder coating layer and the second (or subsequent) powder coating layer(s) each comprise at least one resin independently having at least one functional group that is reactive or crosslinkable with the previously applied layer.

DESCRIPTION OF TIDE DRAWINGS

DETAILED DESCRIPTION OF THE INVENTION

Figure 1:
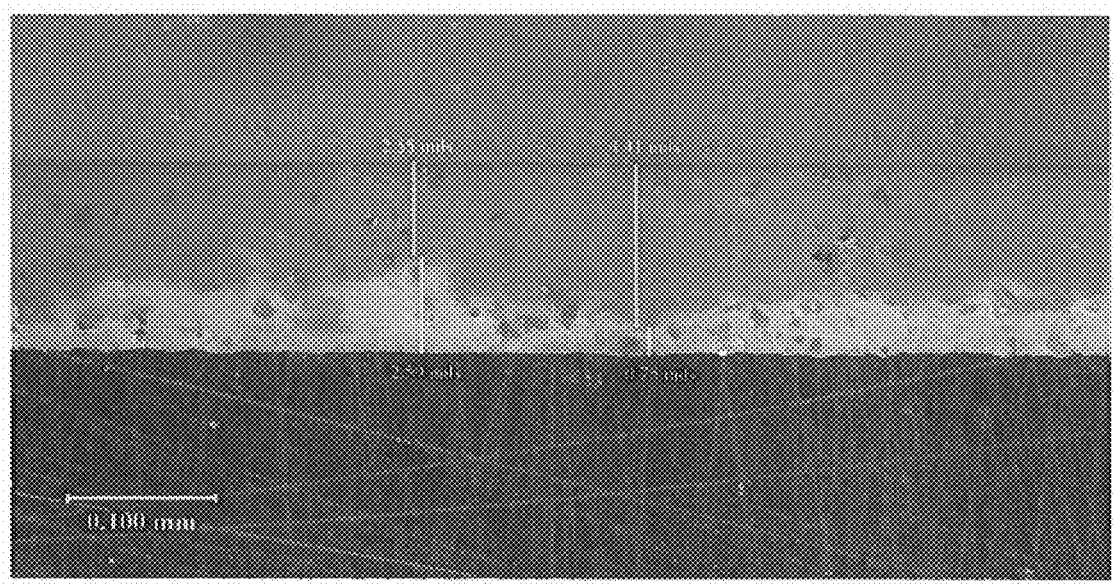
FIG. 1 is a cross-sectional photomicrograph of a powder coating system of this invention, showing the interface of co-reaction of the first layer powder coating and the second layer of a powder coating, by optical microscopy at 200× magnification.

The function of coatings is to provide protection and/or an aesthetic appearance to a substrate. It was found that the process according to the present invention can be used to produce powder coatings films that have excellent intercoat adhesion and the increased bather from co-reaction resulting in improved properties such as corrosion resistance.

The film-forming resin and other ingredients are selected so as to provide the desired performance and appearance characteristics. In relation to performance, coatings should generally be durable and exhibit good weatherability, stain or dirt resistance, chemical or solvent resistance and/or corrosion resistance, as well as good mechanical properties, e.g. hardness, flexibility or resistance to mechanical impact; the precise characteristics required will depend on the intended use. The final composition must, of course, be capable of forming a coherent film on the substrate.

In accordance with this invention, any type of powder coating that has functional groups that are reactive or that can crosslink with functional groups of a second and subsequent powder coating layers can be used for the first powder coating layer and the second powder coating layer, respectively. The film forming component in the first powder coating layer can be the same, or can be different as in the second or subsequent powder layers, so long as they have respective reactive functional groups or cross-linking moieties. In accordance with this invention, at least two different powder coating layers, each having functional groups in stoichiometric ratios sufficient to react or crosslink with each other, are applied to a substrate comprising the steps of application of a first powder coating layer followed by the application of a second powder coating layer, without any substantial curing of the first powder coating layer prior to the application of the second powder coating layer, followed by the simultaneous curing at a temperature and time period sufficient to substantially cure the first powder coating layer and the second powder coating layer.

Various primer/topcoat powder coating layer combinations are possible in a dry-on dry process in accordance with this invention. The primer layer is not heated or cured until after the application of the second powder coating layer, at which time the layers are cured simultaneously wherein the functional groups of the first powder layer and the second powder layer either co-react or cross-link with each other upon application of the second powder coating layer and upon application of heat. For example, the first powder layer can be selected from polymers having hydroxyl, phenol, amino, carboxylic acid, mercapto, epoxy, amine, anhydride, amide, isocyanate, vinyl (double bond for free radical cure), alkene double bond for free radical cure) or other primary or secondary functional or reactive groups; and the second and subsequent powder layer(s) can have functional groups that can chemically react with the first layer or prior layer reactive groups. In one embodiment, at least one layer comprises double bonds and/or other unsaturated moieties that will react with free radicals generated from peroxides or induced by radiation and incorporated into one or more of the layers of powder. According to this invention, any subsequent layers have functionality that reacts with the previously applied layer.

For example, the binder system of the first powder coating layer can be based on a polymeric binder system comprising polyepoxide film-forming resin. The second powder coating layer can be based on a polymeric binder system comprising a carboxyl-functional polyester film forming resin. Such carboxyl-functional polyester systems can be commercial carboxyl-functional polyesters such as Crylcoat 4420-0, which have additional functionalities (residual hydroxyl functionality) for cross-linking. The polyepoxide resins can be glycidyl ethers of bisphenol A such as commercially available DER 672U commercially available from Dow.

Various combinations are listed in the following table based on the functionalities the powder coating layers. These are intended to illustrate the invention but are not to be construed as limiting in any manner the scope thereof.

TABLE 1

| First Layer Functionality | Second Layer Functionality |
| --- | --- |
| Epoxy (Examples: DER 663U, NPES 903, GT7013, GT7014, DER 672U) | Polyester Carboxyl (Examples: Crylcoat 1721-0, Rucote 562, Crylcoat 4488, Rucote 9010, Crylcoat 4420) Polyester Hydroxyl (*reacts with residual Acid functionality of polyester) (Examples: Rucote 102, Rucote 104, Albester 3020, Albester 3110, Lumiflon LF-710F) Amine (Examples: Dyhard 100S, Aradur 2844, Epicure P104, Casmid 783) Phenolic (Examples: DEH 84, DEH 85) Acrylic (Examples: Joncryl 819, Joncryl 848) Anhydride (Examples: SMA3000, SMA1440, SMA3840, SMA2625) |

TABLE 2

| First Layer Functionality | Second Layer Functionality |
| --- | --- |
| Polyester Carboxyl (Examples: Crylcoat 1721-0, Rucote 562, Crylcoat 4488, Rucote 9010, Crylcoat 4420) | Polyisocyanate (NCO) (* reacts with residual OH functionality of polyester) (Examples: Vesatgon B1530, Vestagon BF1540, Crelan EF403, Crelan NW5, Crelan Nl-2, Alcure 4470) Epoxy (* reacts with residual Acid functionality of polyester) (Examples: DER 663U, NPES 903, GT7013, GT7014, DER 672U) Tetramethoxymethyl glycouril (TMMGU) (* reacts with residual OH functionality of polyester) (Examples: Powderlink 1174, Acetomer 1174) Triglycidyl isocyanurate (TGIC) (* reacts with residual Acid functionality of polyester) (Examples: PT810, TEPIC G, Niutang TGIC) Acrylic (Examples: Isocryl EP550, Isocryl EP560, Isocryl EP570) Anhydride (Examples: SMA3000, SMA1440, SMA3840, SMA2625) |

TABLE 3

| First Layer Functionality | Second Layer Functionality |
| --- | --- |
| Polyester Hydroxyl (Examples: Rucote 102, Rucote 104, Albester 3020, Albester 3110, Lumiflon LF-710F) | Polyisocyanate (NCO) (* reacts with residual OH functionality of polyester) (Examples: Vesatgon B1530, Vestagon BF1540, Crelan EF403, Crelan NW5, Crelan Nl-2, Alcure 4470) Epoxy (* reacts with residual Acid functionality of polyester) (Examples: DER 663U, NPES 903, GT7013, GT7014, DER 672U) Tetramethoxymethyl glycouril (TMMGU) (Examples: Powderlink 1174, Acetomer 1174) Triglycidyl isocyanurate (TGIC) (* reacts with residual Acid functionality of polyester) (Examples: PT810, TEPIC G, Niutang TGIC) Hydroxy-alkylamide (HAA) (* reacts with residual Acid functionality of polyester) (Examples: Primd XL552, Primid SF4510, Primid QM1260) |

Evidence of a co-reaction taking place at the interface of the first and second powder coating layers can be confirmed by accelerated testing (QUV), which shows that, upon exposure to ultraviolet radiation there is no reduction in the coating's resistance to the ultraviolet radiation. Without this co-reaction the polyepoxide component would migrate to the top layer and diminish the coatings resistance to ultra violet radiation.

In addition to film-forming binder resin and optional cross-linker, pigment and/or filler there are generally e or more additives that are mixed with the binder for performance characteristics.

The invention is shown in the following example of a two layer system (epoxy based powder coating primer and polyester powder coating topcoat). These are intended to illustrate the invention but are not to be construed as limiting in any manner the scope thereof.

EXAMPLES

The following standard powder coatings were used in these examples.

| First Layer: Epoxy-functional primer | |
|---|---|
| Description | Amount (Wt %) |
| D.E.R. 672U EPOXY RESIN [1] | 43.94 |
| D.E.H. 84 EPOXY CURING AGENT[1] | 13.28 |
| DEH 85 EPOXY CURING AGENT[1] | 1.40 |
| RHEOPLOW PLP-350 ACRYLIC/SILICA MIX[2] | 0.90 |
| BENZOIN | 0.20 |
| BARIUM SULFATE FILLER | 34.95 |
| TITANIUM DIOXIDE PIGMENT | 4.79 |
| BLACK IRON OXIDE PIGMENT | 0.54 |
| | 100.00 |

[1]commercially available from DOW Chemical.
[2]commercially available from KS CNT CO., LTD.

| Second Layer: Carboxyl-functional polyester | |
|---|---|
| Description | Amount (Wt %) |
| CRYLCOAT 4420-0 CARBOXYL POLYESTER [1] | 68.25 |
| PRIMID XL-552[2] | 5.14 |
| RHEOFLOW PLP-350 ACRYLIC/SILICA MIX[3] | 0.93 |
| BENZOIN | 0.30 |
| MATTING AGENT | 1.03 |
| BARIUM SULFATE FILLER | 18.10 |
| TITANIUM DIOXIDE PIGMENT | 4.55 |
| BLACK IRON OXIDE PIGMENT | 0.10 |
| PHTHALO BLUE PIGMENT | 1.60 |
| | 100.00 |

[1] commercially available from Cytec Industries.
[2]commercially available from EMS-CHEMIE AG.
[3]commercially available from KS CNT CO., LTD.

Figure 2:
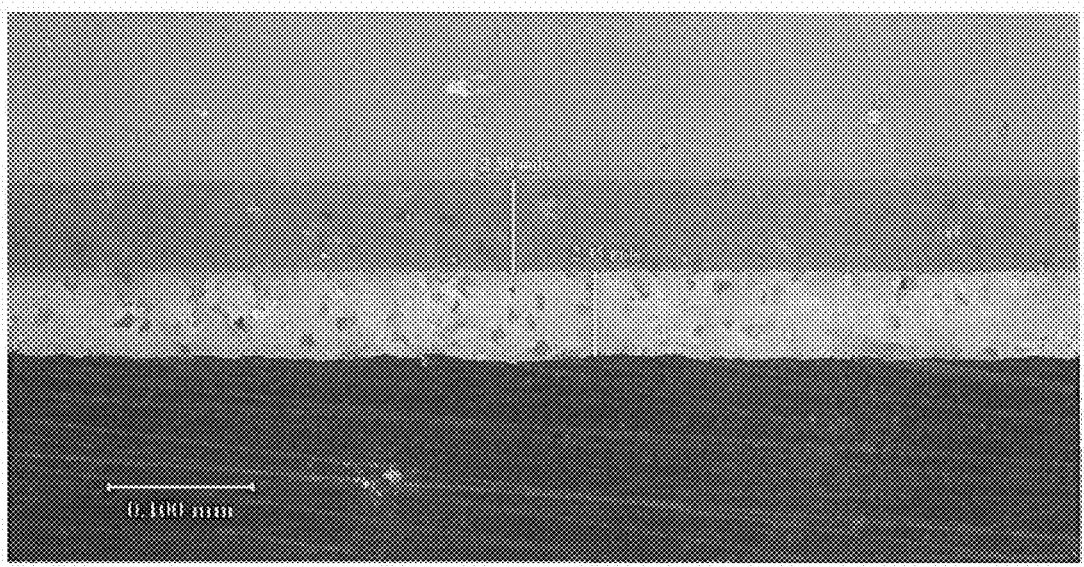
FIG. 2 is a cross-sectional photomicrograph of a fused powder coating system where second powder coating layer is applied over a first powder coating melt, by optical microscopy at 200× magnification.
Figure 3:
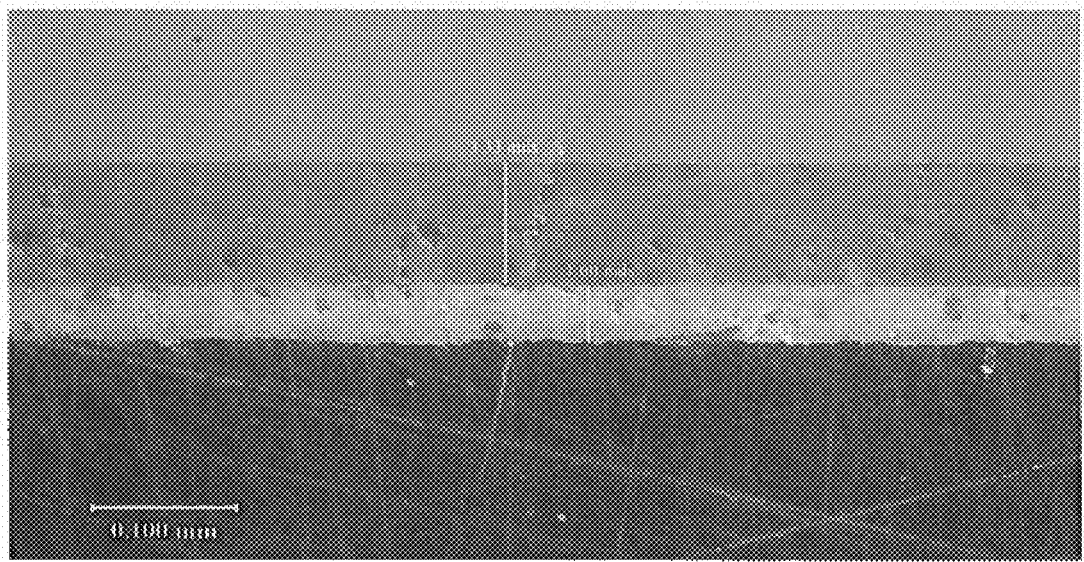
FIG. 3 is a cross-sectional photomicrograph of a conventional powder coating utilizing conventional process steps of applying a second powder coating layer over a cured first powder coating layer, by optical microscopy at 200× magnification.

The above first layer powder coating ("first layer") and second layer powder coating ("second layer") were electrostatically applied to four test panels of CRS-cold rolled steel at approximately 2.0-3.0 mils applied coating thickness each, as follows:
Panel 1: Second layer only, then heated 10 min@205 C.
Panel 2: Second layer applied to first layer, prior to cure of first layer, then both layers cured simultaneously for 10 min@205 C (i.e., dry-on-dry according to this invention as shown in FIG. 1).
Panel 3: First layer applied and heated 1 min@205 C to allow melt/gel, followed by application of the second layer, then both layers cured simultaneously for 10 min@205 C (i.e., fused primer as shown in FIG. 2).
Panel 4: First layer applied an fully cured for 10 min@205 C, followed by application of the second layer, then cured simultaneously 10 min@205 C (i.e., fully cured layers of FIG. 3).

The panels are cured to ambient temperature and tested and compared for impact and cross-hatch adhesion.

| | Panel 1 | Panel 2 | Panel 3 | Panel 4 |
|---|---|---|---|---|
| Film thickness (Dir/Rev)Impact | ~2-3 mil (0/0)in. lbs | ~4-5 mils (60/20)in. lbs | ~4-5 mils (60/0)in. lbs | ~4-5 mils (0/0)in. lbs |
| Cross-Hatch Adhesion | Poor - <2B | Excellent 4B-5B | Poor <2B | Poor <2 |

Evidence of a co-reaction between a first polyepoxide layer and a second layer without the required curative can be seen in the above examples when applied in a conventional process or melt process, as compared to a dry-on-dry process. In the case of the conventional process (Panel 4) and the fused process (Panel 3), the intercoat adhesion was very poor, indicating that no co-reaction of the first and second coating layer is taking place. In the case of the dry-on-dry process of Panel 2, adhesion was very good which indicates that a co-reaction had taken place between the first and second coating layer. Thus, the above comparative examples show that the method of Panel 2 (dry on dry) of the present invention compare very favorably against the conventional and fused system powder coating methods.

It will be appreciated by those skilled in the art that changes could be made to the embodiments described above without departing from the broad inventive concept thereof. It is understood therefore, that this invention is not limited to the particular embodiments disclosed, but is intended to cover modifications that are within the spirit and scope of the invention, as defined by the claims.

We claim:
1. A method for the application of at least two different powder coating layers to a substrate comprising the steps of:
   (a) applying a first powder coating layer on the substrate;
   (b) applying a second powder coating layer on the first powder coating layer prior to any substantial curing of the first powder coating layer;
   (c) curing at a temperature of at least 200° C. for a time period sufficient to simultaneously cure the first powder coating layer and the second powder coating layer, wherein the first powder coating layer and the second powder coating layer co-react at an interface thereof; wherein the first powder coating layer and the second powder coating layer each comprise at least one polymer resin independently having at least one functional group in stoichiometric ratios sufficient to react or crosslink with the other layer, wherein the at least one functional group of the first powder coating layer is selected from the group consisting of hydroxyl, phenol, amino, carboxylic acid, mercapto, epoxy, amine, anhydride, amide, isocyanate, vinyl, and alkene, wherein the cured coating has a crosshatch adhesion of 4B to 5B.

2. The method of claim 1, wherein the first powder coating layer has functionality selected from the group consisting of epoxy, polyester carboxyl and polyester hydroxyl.

3. The method of claim 1, wherein the first powder coating layer has epoxy functionality capable of reacting with the second powder coating layer having functionality selected from the group consisting of polyester carboxyl, polyester hydroxyl, amine, phenolic, acrylic and anhydride.

4. The method of claim 1, wherein the first powder coating layer has polyester carboxyl functionality capable of reacting with the second powder coating layer wherein the second powder coating layer is selected from tetramethoxymethyl glycouril, triglycidyl isocyanurate, hydroxyalkylamide, or resins having functionality selected from the group consisting of isocyanate and epoxide.

5. The method of claim 1, wherein the first powder coating layer has polyester hydroxyl functionality capable of reacting with the second powder coating layer wherein the second powder coating layer is selected from tetramethoxymethyl glycouril, triglycidyl isocyanurate, hydroxyalkylamide, or resins having functionality selected from the group consisting of isocyanate and epoxide.

6. A multi-layered coating system obtainable from the method of claim 1.

\* \* \* \* \*